(12) United States Patent
Laganière et al.

(10) Patent No.: US 8,139,817 B2
(45) Date of Patent: Mar. 20, 2012

(54) FACE IMAGE LOG CREATION (75) Inventors: Robert Laganière, Gatineau (CA); Adam Fourney, Ottawa (CA)

(73) Assignee: Telewatch Inc., Ottawa, Ontario (CA)

( * ) Notice: Subject to any disclaimer, the term of this patent is extended or adjusted under 35 U.S.C. 154(b) by 1081 days.

(21) Appl. No.: 11/741,235

(22) Filed: Apr. 27, 2007

(65) Prior Publication Data

US 2008/0267458 A1 Oct. 30, 2008

(51) Int. Cl.
*G06K 9/00* (2006.01)
(52) U.S. Cl. ........................................ 382/103; 382/118
(58) Field of Classification Search .................. 382/118, 382/103
See application file for complete search history.

(56) References Cited

U.S. PATENT DOCUMENTS

| | | | | |
|---|---|---|---|---|
| 7,039,221 B1* | 5/2006 | Tumey et al. | ............... | 382/118 |
| 2005/0271251 A1* | 12/2005 | Russell et al. | ............... | 382/103 |
| 2006/0204058 A1* | 9/2006 | Kim et al. | ............... | 382/118 |
| 2007/0097112 A1* | 5/2007 | Greig | ............... | 345/419 |
| 2007/0269082 A1* | 11/2007 | Matsuyama | ............... | 382/118 |
| 2008/0089561 A1* | 4/2008 | Zhang | ............... | 382/118 |

OTHER PUBLICATIONS

Vincent Girondel, Alice Caplier and Laurent Bonnaud, Real Time Tracking of Multiple Persons by Kalman Filtering and Face Pursuit for Multimedia Applications, 2004, IEEE, pp. 202-205.
Hung-Xin Zhao and Yea-Shuan Huang, Real-Time Multiple-Person Tracking System, 2002, IEEE, pp. 897-900.
Charay Lerdsudwichai and Mohamed Abdel-Mottaleb, Algorith For Multiple Multimedia Trackiing, 2003, IEEE, pp. II-777-II-780.
Kun Peng, Liming Chen, Su Ruan and Georgy Kukharev, A Robust Algorithm for Eye Dectection on Gray Intensity Face without Spectacle, JCS&T, vol. 5, No. 3, Oct. 2005, pp. 127-132.
Mark Everingham, Josef Sivic and Andrew Zisserman, "Hello! My name is ... Buffy"—Automatic Naming of Characters in TV Video, British Machine Vision Association, Sep. 4-7, 2006.
M. Subasic, S. Loncaric, T. Petkovic, H. Bogunovic and V. Krivec, Face Image Validation System, Proc. ISPA, 2005, pp. 30-33.
Margaret M. Fleck, David A. Forsyth and Christ Bregler, Finding Naked People, 2006, European Conference on Computer Vison, vol. II, pp. 592-602.
Doron Shaked and Ingeborg Tastl, Sharpness Measure: Toward Automatic Image Enhancement, Hwelett packard Development Company, L.P., Jun. 10, 2005, HPL-2004-84 (R.2).

* cited by examiner

*Primary Examiner* — Vu Le
*Assistant Examiner* — Soo Park
(74) *Attorney, Agent, or Firm* — Freedman & Associates (57) ABSTRACT

A system and method are provided for constructing face image logs from video surveillance that are complete and concise in the sense that the logs contain only the best images available for each individual observed. The quality of the face images are assessed and scored based upon a plurality of image criteria. The image criteria are combined to an overall quality score. The quality score is associated with the face image enabling the face log to be purged so that only high quality face images are contained in the log.

20 Claims, 11 Drawing Sheets

FACE IMAGE LOG CREATION

TECHNICAL FIELD

The present invention relates to video surveillance systems and in particular to the creation of face image logs from captured video.

BACKGROUND

In video surveillance systems it is often useful to summarize the collected surveillance video of people in the monitored scene by images of the faces visible in the original video sequence. The sequence of faces images is referred to as face image logs. Whether reviewed by security personnel, or an automated system; processed in real-time, or upon request; these logs allow investigators to determine who was in the vicinity of the surveillance camera at any particular moment in time without having to view the video sequence itself.

In general, face image logs need to be complete in the sense that they should contain, at the very least, one high quality image for each individual whose face appeared unobstructed in the original video. High quality images are important because they maximize the probability that an individual will be correctly identified.

The most direct approach to constructing complete face image logs involves using existing face detection technologies to extract face images directly from video sequences, and immediately appending each of these detections to the face log. In this scenario, one face may be detected per person per frame. Surveillance footage, captured at 15 frames per second, could potentially capture 900 face images per person per minute. The high rate of detections could easily overwhelm any human operator or automated biometric face recognition system that might be trying to process the face image log in real time. Real-time or not, much of this processing is wasteful since each individual may appear in the log numerous times.

Face image validation systems have been used for analysis of images of faces to determine if they are suitable for use in identification documents such as passports but have been limited in their applicability to real-time applications. While the technique does provide a numeric quality score for input images, it is mainly for detecting images that do not meet the criteria established by the International Civil Aviation Organization; and their decisions are inherently binary. In addition the face images are acquired in a relatively controlled manner with on a limited range of variation in subject conditions. In contrast, a more continuous appraisal system is required when selecting high quality face images from video sequences.

Accordingly, there is a need for quality appraisal of face images for the purpose of selecting high quality faces from video sequences.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present invention are described below, by way of example only, with reference to FIGS. 1-11.

In accordance with one aspect there is provided a method of generating face logs that is concise and complete from a video sequence, the method comprising the steps of: acquiring frames from the video sequence; determining one or more face images in each frames associated with one or more subjects; determining a quality score for each of the one or more face images based upon a plurality of criteria associated with the face image; and purging face images from the face log which are below a minimum quality score.

In accordance with another aspect there is provided a system for generating concise and complete face logs from a video sequence, the system comprising a face detection module for determining face images of one or more subjects from candidate regions within each frame of the video sequence; a quality analysis module for receiving face images from the face detection module and determining a quality score based a plurality of criteria of the face images; and a storage means for storing the analyzed face images in a face log with an associated quality score, wherein the face log is periodically purged based upon the score of the acquired images.

In accordance with yet another aspect there is provided a computer readable medium containing instructions for generating concise and complete face logs from a video sequence, the instructions which when executed by a processor perform the steps of acquiring frames from the video sequence; determining one or more face images in each frames associated with one or more subjects; determining a quality score for each of the one or more face images based upon a plurality of criteria associated with the face image; and purging face images from the face log which are below a minimum quality score.

The creation of face image logs from video sequences should be concise as possible to ensure adequate images are provided to identify an individual yet not unnecessarily consume processing or storage resources by providing excessive numbers of images. A concise face log need not contain every instance of every face as it only takes one good quality image to identify an individual. With each image captured of the same individual there may be vast variations in face resolution, pose, illumination and sharpness. In order to reduce the number of faces added to a face log, person oriented face log construction enables only high quality image(s) for each individual to be stored reducing capacity requirements and operator intervention or judgment. To accomplish this, faces need to be tracked in a scene in addition to simply being detected. By doing so, a face image history can be compiled for each individual in the scene. When an individual leaves the scene, one or more high quality images are selected from his or her face history, and these images are added to the face log. The number of faces selected for the log depends on the confidence in the face tracking results; more faces are added to the log when the tracker results are poor. By using person oriented face logs, it is possible to avoid overwhelming face recognition systems, when attempting to process these logs in real-time.

There are many uncertainties when developing a person oriented face logging system. For instance, it is not obvious how the quality of face images should be assessed and compared so that high quality images can be selected. It is also unclear how the face selection process should proceed in situations where there is low confidence in the tracker results.

Constructing face image logs can be divided into four major tasks: face detection, face tracking, face quality analysis, and the selection of high quality face images to be append to the face image log. Regarding the detection of faces for the purpose of tracking, techniques have been suggested that involve the use of skin color segmentation to locate candidate face regions. Other techniques have detected frontal faces using cascades of simple classifiers. Some strategies for tracking the resulting face regions include techniques based on the overlapping of bounding boxes, techniques using partial Kalman filtering for motion prediction, and techniques which use the mean shift method for tracking.

In order to select high quality face images, it is necessary to develop a procedure for their appraisal. Of course, the quality of a face image is rather subjective. Face image quality corresponds roughly to an image's potential to lead to a correct identification when using existing face recognition software. It is assumed that any image useful for biometric face recognition would also be useful when manually attempting to identify an individual.

Many criteria, weighted to varying degrees of importance, are considered when determining the quality of a face image. These criteria include image characteristics such as resolution, pose, illumination, skin content and sharpness. These criteria can be measured to determine how they contribute to the overall quality score of an image. With the exception of skin detection, each of the following scoring procedures expects a grayscale image of an upright face as input. It is important to note that, depending on the method by which faces are detected and tracked, many of the intermediate results used for assessing quality may be readily available. For example, the location of the eyes, the contour of the face, and the location of skin colored pixels may have been computed when the face tracker was locating candidate face regions. Additionally, it is also important to recognize that the scoring procedures do not directly distinguish between face and non-face images (except for in certain extreme situations) since this is precisely what the face tracker is expected to provide. In general, however, high quality face images out perform non-face images.

Figure 1:
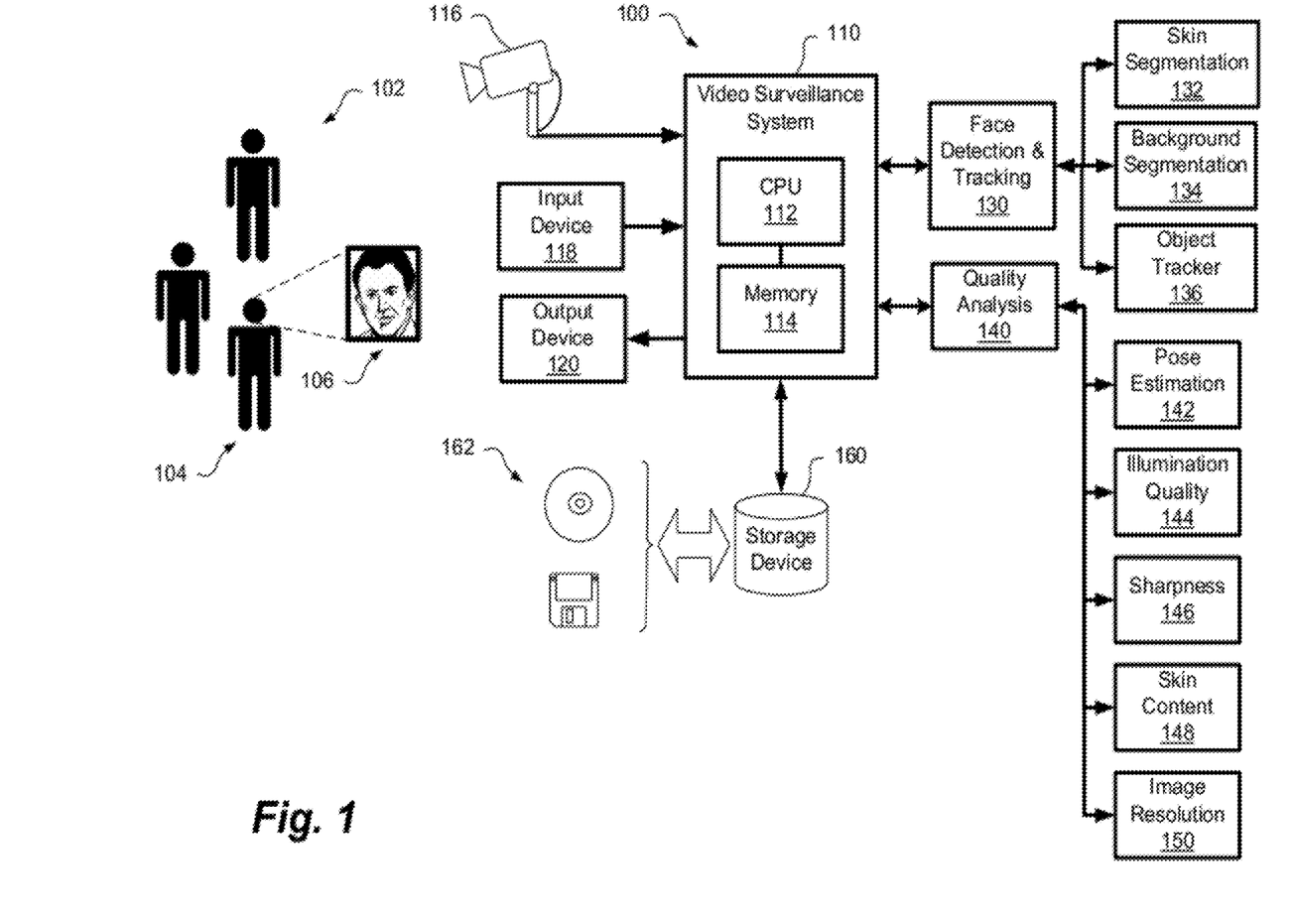
FIG. 1 is a system for face tracking and face log creation.

FIG. 1 shows an illustrative example of a system 100 for face tracking and face log creation. A scene or location is monitored by a video camera 116 operatively coupled to the video surveillance system 100. The video camera 116 may be for capturing motion video or still images providing of the scene. An individual or subject 104 or a group of individuals 102 may enter scene covered by the video camera 116. An image or frame of the scene is captured by the video (or still) camera 116. The images are sent to the video surveillance system 110 for viewing and for further processing. The video surveillance system 110 may be associated with individual cameras or multiple cameras covering one or more scenes. Alternatively, the video surveillance system may be used for post processing of stored video surveillance footage from video cameras provide by another system or storage device.

The system 110 comprises a central processing unit (CPU) for executing software for performing video analysis. Programming instructions are retrieved from memory 114 associated with the CPU 112 which intern may be retrieved from a storage device 160. The storage device 160 provides storage for original video or images and processed images. The storage device may be any type of memory such as a solid state memory, tape, hard drive or optical based storage mediums or may contain data provided by an external medium 162 such as for example a floppy disk, digital video disc (DVD), compact disk (CD), solid state memory or external hard drive. The storage device may also contain the computer programmable code for operating the system. Input device 118 may be used by an operator of the video surveillance system for controlling cameras and for operating the surveillance system. An output device 120 such as a video display may be used by the operator to view the face logs or original video sequence.

Face detection and face tracking are executed by the CPU 112 from code stored in the memory 114. The face detection and tracking module 130 may be further divided into skin segmentation 132 and background segmentation 134 for analyzing the video frame and determining where the individuals face is visible and providing face images to the quality analysis module 104 and object tracking 136 for tracking movement of a candidate region between frames within the video sequence. The quality analysis module 140 analyzes the face image to assign a quality score to the image and to determine if it is of suitable quality for storage in the face log. Modules for assessing criteria relative to the face image are provided. The modules for determining criteria may include but not be limited to pose estimation 142 for determining orientation of the image, illumination quality 144 for determining dynamic range and evenness, sharpness 146, skin content 148 for determining the amount of human skin in the image and image resolution 150. Each module can determine a score for one or more criteria in addition it should be understood that the functions provided by the modules shown may be combined or divided depending on the particular system configuration. For example, the face detection and tracking may be performed by separate dedicated systems or implemented in separate modules. Similarly the face detection and tracking module 130 may operate independently of quality analysis module 140 and may reside on distinct systems if required. Analysis of the images may be performed in a real-time or non-real-time environment depending on configuration.

Through the face detection and tracking module 130, a face image 106 of an individual is provided to the quality and analysis module 140. Six criteria are assessed to determine an overall quality score for the image.

Pose Estimation in Face Images

One of the most challenging problems encountered by face recognition systems involves properly identifying individuals despite variations in pose. Generally, faces can experience out-of-plane rotations of up to 60° before important facial features are no longer visible. As usual, an out-of-plane rotation of 0° occurs when an individual looks directly at the camera, providing a perfectly frontal view of the face. It is expected that a robust face detector should return face images whose pose falls within the slightly narrower range of 45°. Consequently, it is important that the quality score be able to distinguish between various rotations, and award higher scores to the least rotated images.

Figure 2:
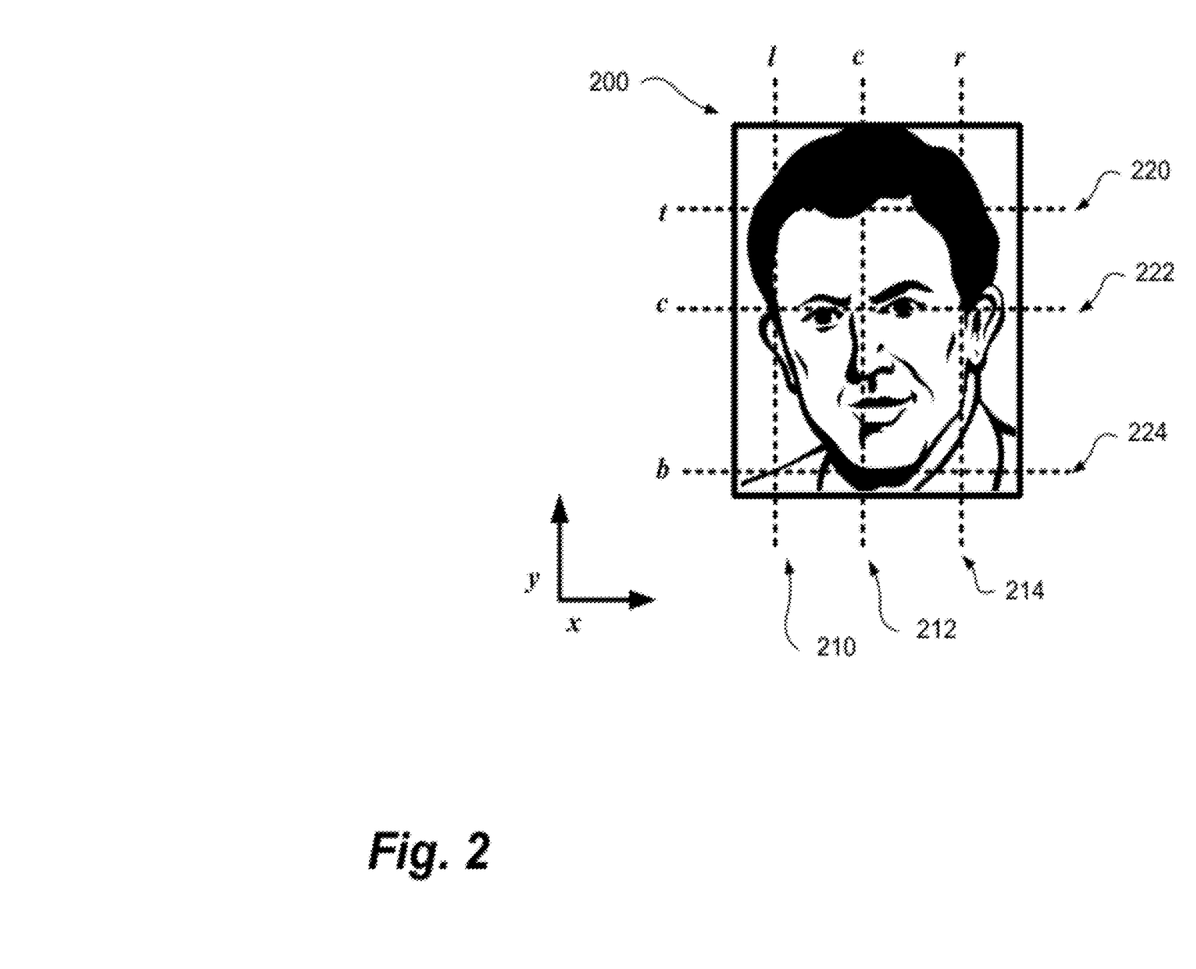
FIG. 2 is an illustrative example for determining pose estimation criteria.

In order to estimate pose, as shown in FIG. 2, using a face image 200, three columns are located on the face image: the first two columns, defined by x=l (210) and x=r (214), estimate the locations of the left and right visible edges of the face, respectively. The third column, x=c (212), approximates the face's axis of natural horizontal symmetry. Importantly, the face image is symmetric about the line x=c, only when the face is not rotated. The values of l, r and c are determined by analysis of the gradient image in order to locate the left and right sides of the face, as well as the vertical location of the eyes, y=m (222) relative to the top y=t (220), bottom y=b (224). From these values the approximate location of the eyes can be estimated, and the brightest point in this region is expected to represent the vertical center of the face. Unfortunately, this method is not effective when subjects are wearing glasses.

If the face has not experienced an out-of-plane rotation, and the values l, r, and c are accurate, then it is expected that c is equidistant from l and r. As a face experiences rotation, c deviates from it is expected position c*. The following equation can be used to estimate the angle of rotation:

$$\theta = \begin{cases} 90° & \text{if } \left|\frac{2(c-c^*)}{r-l}\right| < l \\ \frac{180°}{\pi}\sin^{-1}\left(\frac{2(c-c^*)}{r-l}\right) & \text{otherwise} \end{cases}$$

This is not a particularly good estimator because it models the human head as a cylinder. However, high accuracy is not needed since a it will not be used in any computations other than the following equation:

$$S_1 = \begin{cases} 0 & \text{if } \theta > 45° \\ 1 - \left|\frac{\theta}{45°}\right| & \text{otherwise} \end{cases}$$

where $S_1$ represents the quality score awarded to the image for pose. This score has the desirable property that it decreases linearly as the estimated angle of rotation increases. Notice that values of $\theta$ greater than 45° are considered to be inaccurate, and result in a score of zero.

Measuring the Quality of Illumination

Figure 3:
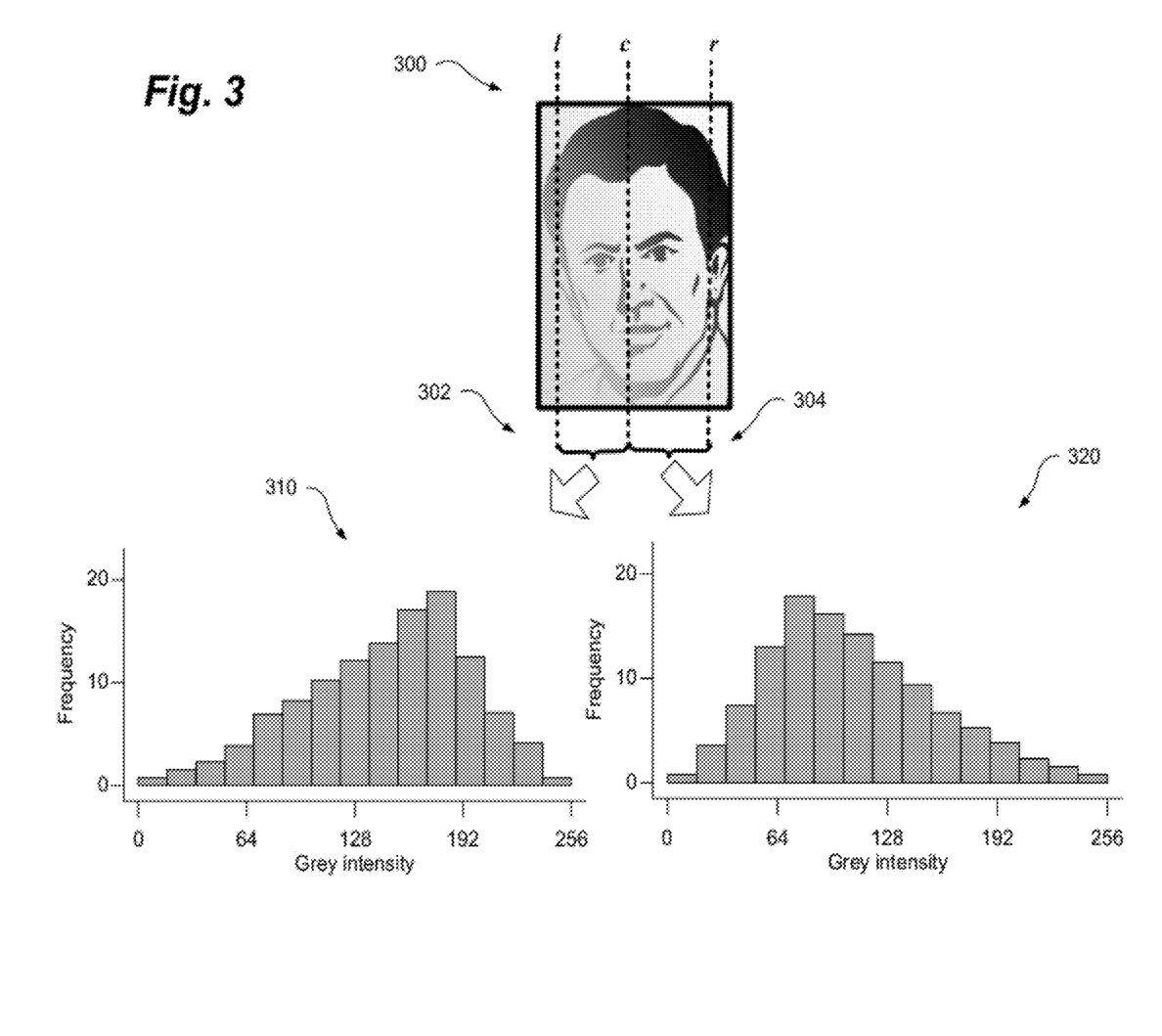
FIG. 3 is an illustrative example for determining illumination criteria.

As shown in FIG. 3, variations caused by changes in illumination constitute yet another significant challenge encountered by automated face recognition systems. In fact, certain methods of face identification are more sensitive to differences in lighting than they are to the differences between distinct individuals. In order to compensate for different lighting conditions, face identification systems may use histogram equalization, or similar histogram dependent techniques, in order to normalize an image before processing. For this reason, it is very important to begin with images which make the best (maximum) use of the available dynamic range. This utilization ∪ is estimated by determining the smallest range of gray intensities to which at least 95% of an image's pixels can be attributed. The score $S_2$ is simply the percentage of the total dynamic range represented by ∪. For example, if the input is an 8-bit grayscale image, then $S_2 = ∪/256$.

Utilization of available dynamic range is not the only desirable property of properly illuminated face images; faces should also be evenly lit. In other words, one side of the face should not appear brighter than the other. Using measurements obtained when estimating pose, the evenness of the illumination can be determined by comparing the histograms of the opposing halves of the face as shown with face image 300. Let L and R be the grey intensity histograms (310 and 320 respectively) attributed to the left 302 and right 304 halves of the face, normalized so that the integrals over their respective bins are both equal to one. The score $S_3$, which represents the evenness of the illumination, is then equal to the integral of the histogram resulting from the intersection L∩R.

Determining the Sharpness of an Image

Figure 4:
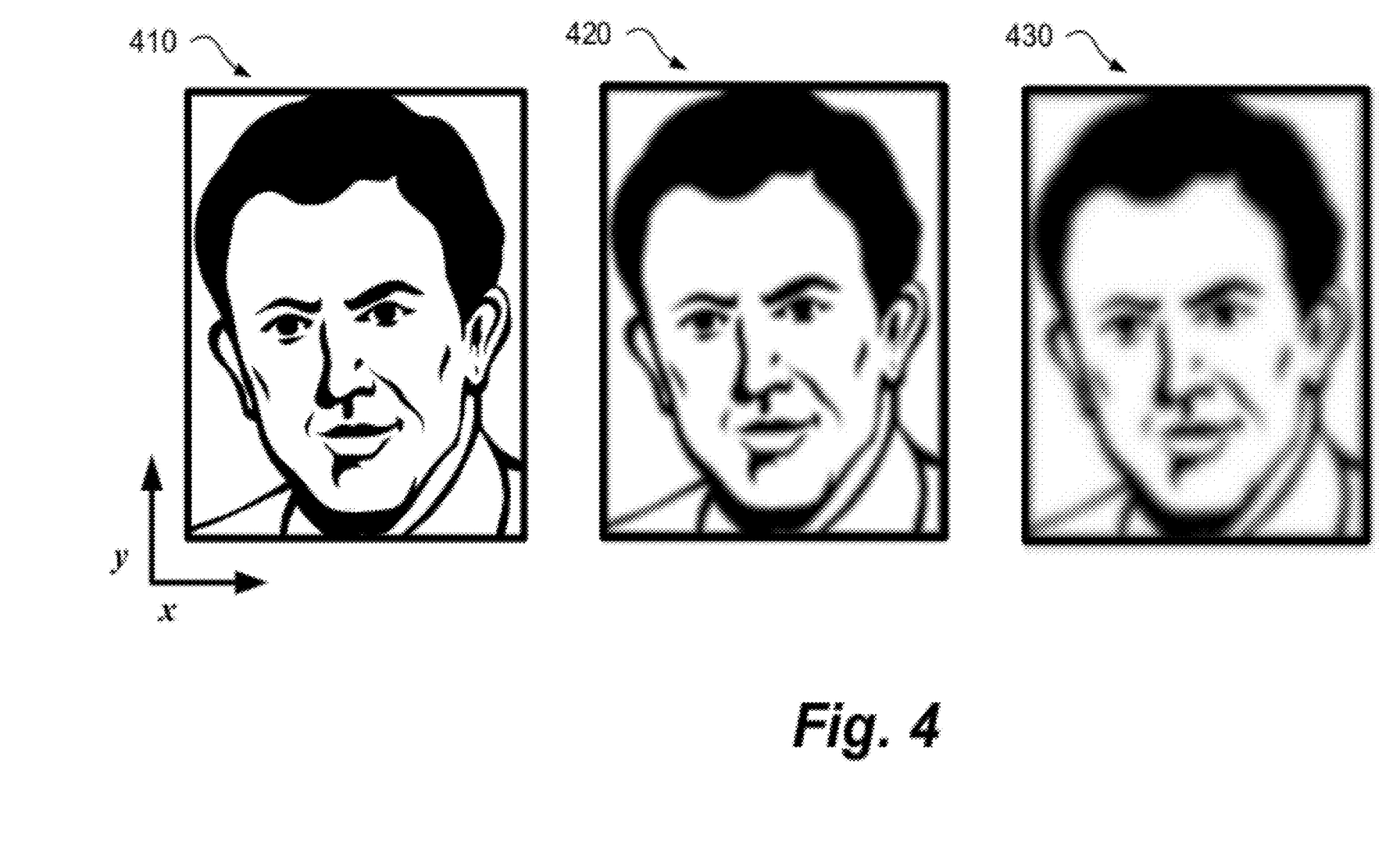
FIG. 4 is an illustrative example for determining sharpness criteria.

It is important that a face image's score reflect its sharpness. Images marred by motion blur, for example, should score quite poorly. As shown in FIG. 4 each image may have a level of sharpness associated with the focus of the face and also related to the size of the image. For example image 410 is sharper than image 420, which is relatively more sharp than image 430. The main assumption in measuring the sharpness of face images is that these images should have comparable power spectra. Consequently, a simple global measure of sharpness defined for a given image represented by the function a(x,y), let A(u,v) be its corresponding frequency domain representation. Given the frequencies $f_1$ and $f_2$, where $f_1 < f_2$, define:

$$H = \{(u, v) \mid \|(u, v)\|_2 > f_2, (u, v) \in A\}$$

$$L = \{(u, v) \mid f_1 < \|(u, v)\|_2 \leq f_2, (u, v) \in A\}$$

$$Sh = \frac{\int_{(u,v) \in H} |A(u, v)|^2}{\int_{(u,v) \in L} |A(u, v)|^2}$$

where Sh measures the global sharpness of the image. While this measure provided excelled results, it useful to further refine the procedure by omitting the frequency terms that occur at orientations within 10° of the u or v-axis. This effectively masks out the unnatural step function that occurs at the boundaries of the image as result of the cyclic nature of the Fourier transform. In practice, the frequencies $f_1$ and $f_2$ are chosen so that it would be highly improbable for a natural face to achieve a sharpness score greater than 1. Thus, an image's official sharpness score is defined as:

$$S_4 = \min\{1, Sh\}$$

Detecting the Presence of Human Skin

Figure 5:
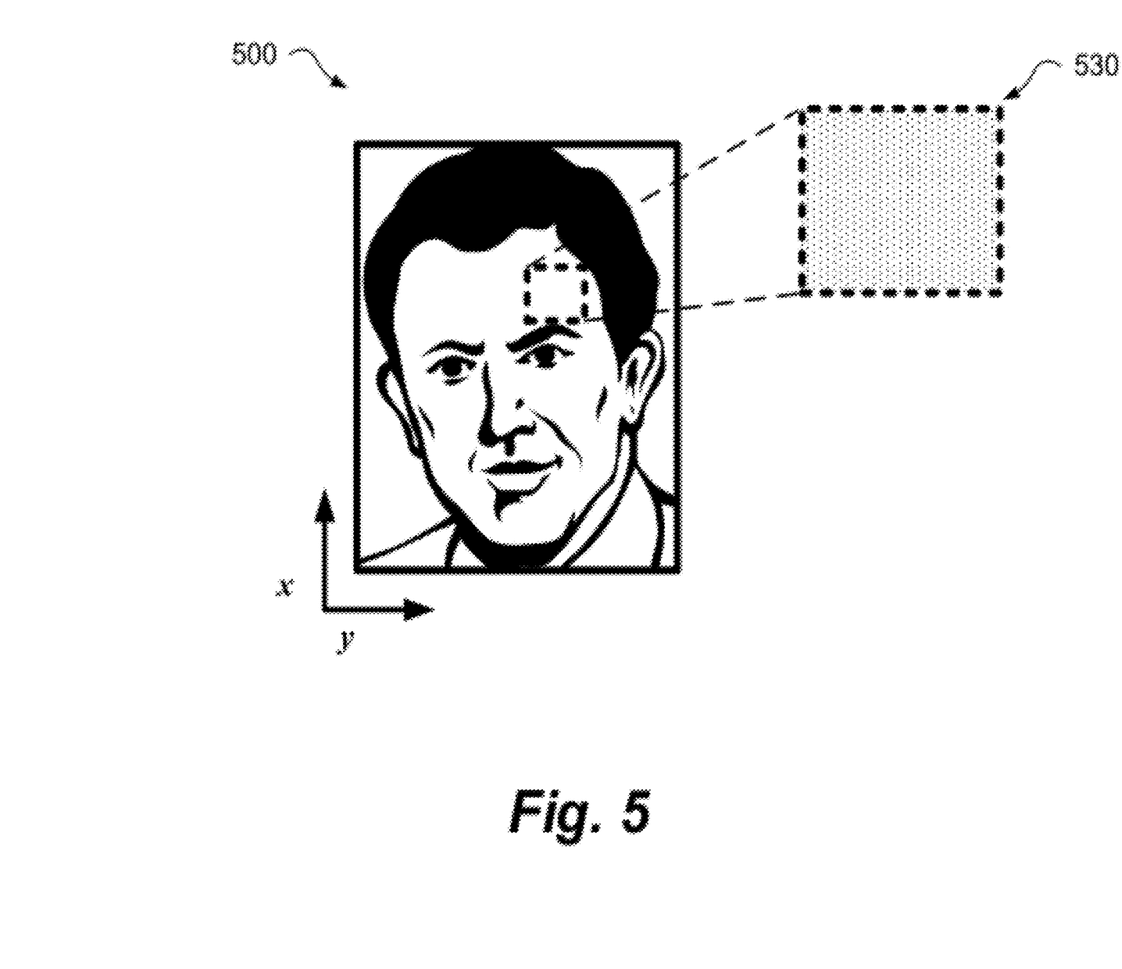
FIG. 5 is an illustrative example for determining skin content criteria.

Images of faces are expected to be composed mostly of flesh-toned pixels. Lack of such pixels could indicate that an image's color temperature is not properly balanced, or that the color has been washed out due to overly harsh lighting conditions. In either case, such images should score poorly in overall quality. As shown in FIG. 5, with face image 500, the pixels representing flesh tones, for example as shown in portion 530, are generally tightly clustered in a small region of hue-saturation color space and can be obtained using a region containing all hues between −30° and 30° and saturated between 5% and 95%. An image's skin score $S_4$ is computed as the percentage of its pixels that occur within this region. This measure is most useful when skin color segmentation is not already being used for locating candidate face regions, such as when cascades of simple classifiers are used for face detection.

Image Resolution

Figure 6:
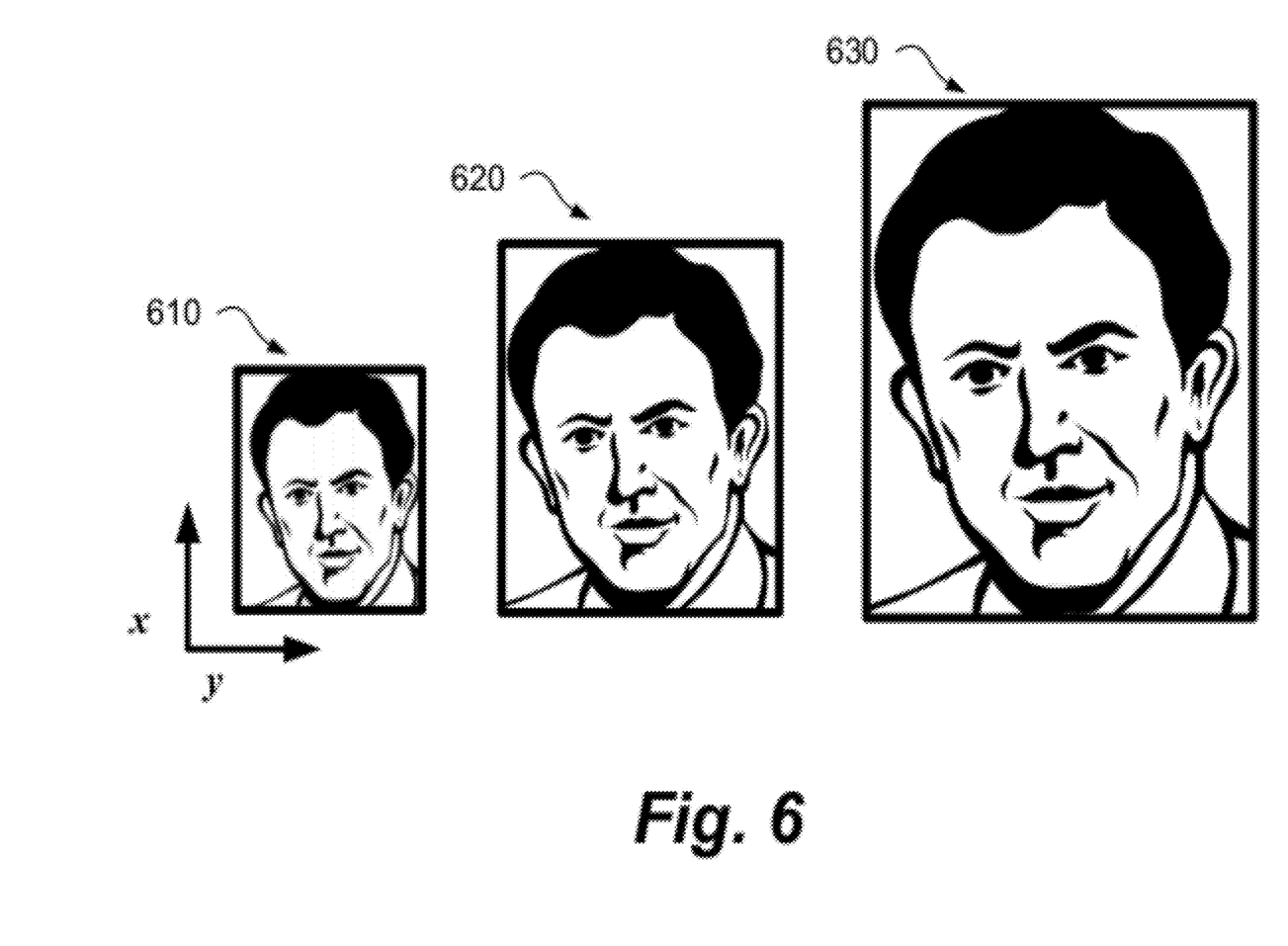
FIG. 6 is an illustrative example for determining image resolution criteria.

An image's resolution score is perhaps the easiest of the aforementioned criteria to measure. The resolution of a face image is defined to be the area of its bounding rectangle. In general, high resolution images are preferred over low resolution images. As shown in FIG. 6, three face images, 610, 620 and 630 provide different resolution images and hence varying face recognition quality. For example image 630 is of higher resolution than image 610. Consequently, the resolution score of an image having dimensions w×h, is computed as follows assuming an optimal image resolution is 60×60 pixels:

$$S_5 = \min\left\{1, \frac{\sqrt{wh}}{60}\right\}$$

Combining the Criteria Into a General Score

Each of the six criteria discussed in the previous sections can score in the range [0, 1], however any definable range may be utilized. Although each criteria may be ranked in the same range they need not contribute equally to an image's overall quality score. For this reason, they are combined according to the following weighted sum:

$$S = \frac{\sum_{i=1}^{6} W_i S_i}{\sum_{i=1}^{6} W_i}$$

where the coefficients Wi determine the impact each of the quality criteria have on the final score. Weights can be adjusted based upon the criteria that contribute the most to facial recognition. Table 1 shows an example of how each of the weights and thresholds may be used to combine the six quality criteria into a single overall score.

| i | Weight ($W_i$) | Threshold ($T_i$) |
|---|---|---|
| 1 (Pose estimation) | 2 | 0.8 |
| 2 (Dynamic range) | 1 | 0.2 |
| 3 (Evenness) | 1 | 0.4 |
| 4 (Sharpness) | 70/3 | 0.13 |
| 5 (Skin content) | 10/7 | 0.4 |
| 6 (Image resolution) | 2 | 0.5 |

When using a weighted sum alone, it becomes difficult to develop a single set of weights that works both when an image scores moderately well in all criteria, as well as when an image scores in the extremes of one or more criteria. To address this issue, a threshold $T_i$ is associated to each of the individual quality criteria.

An image is determined to be useful for identification purposes, with respect to the $i^{th}$ image criteria, exactly when $S_i > T_i$. For each criteria where this occurs, a value of 1.0 is added to the final score S. In this way, an image's score primarily reflects the number of criteria satisfied, while the original weighted sum is used to break ties between images satisfying an equal number of criteria.

Figure 7:
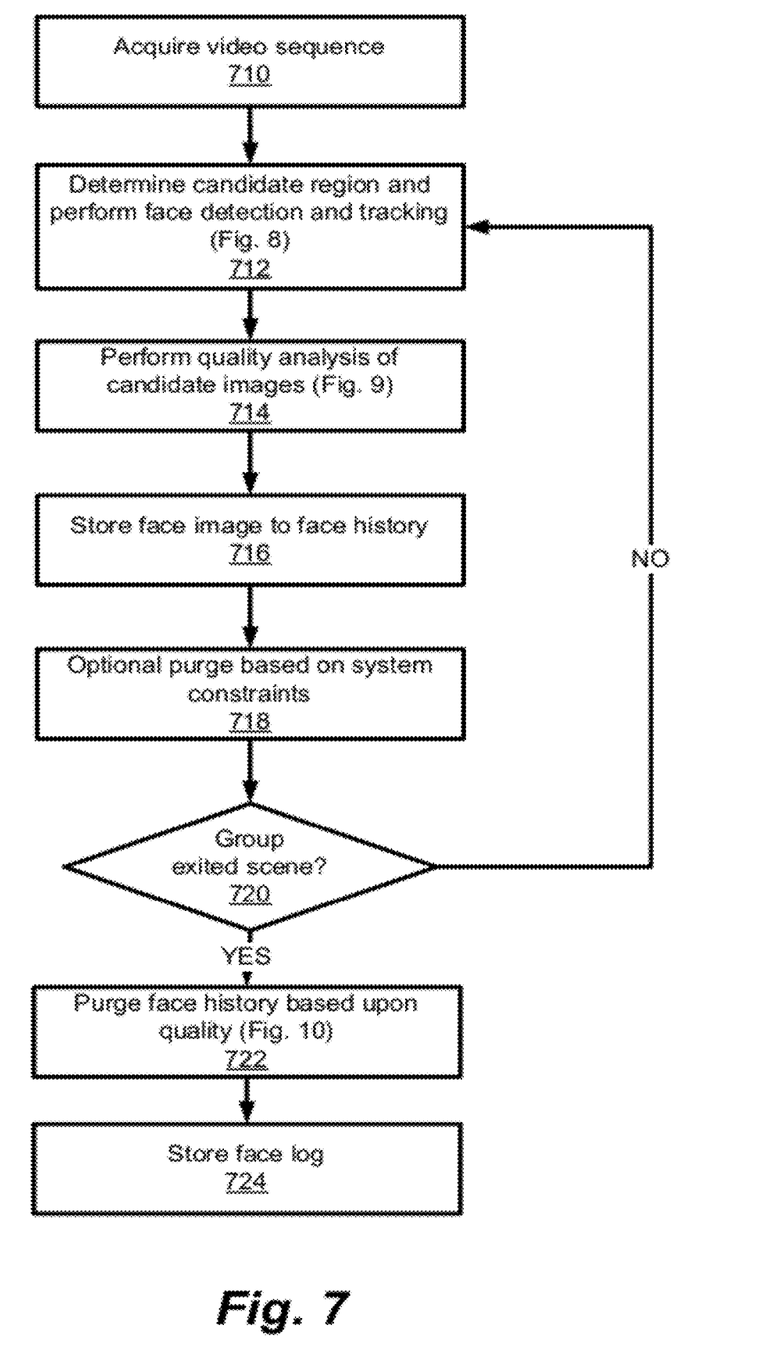
FIG. 7 is a method of face log creation.

A method of face log creation using a image quality score is shown in FIG. 7. At step 710 the video sequence is acquired. At step 712 from individual frames of the video sequence potential candidate face image regions must be defined and the region must then be tracked between frames when an individual or a group enters the scene as discussed in further detail in connection with FIG. 8. With a reliable face tracking algorithm, at most one face should be detected per person per frame. In these cases, selecting the best face image for each individual is rather trivial; as each frame is processed, simply retain the highest quality face detected for the individual thus far. Unfortunately, there are many real world situations in which the face tracker's results are ambiguous. In such situations, care must be taken to ensure that all individuals are represented by the face image log.

The concept of a person group (or more simply, a "group") is introduced to define a set of people whose detected faces can not be distinguished by the face tracker. Single individuals can be considered person groups of size one, and do not need special consideration. More generally, face groups can be constructed in situations where the face tracker has indicated low confidence in its results. In these cases, it is understood that the tracker is following a group of people rather than a single individual.

For the purpose of face log construction, it is assumed that a group's membership remains constant throughout its existence. This assumption can be justified if a group is assigned a new identity whenever its membership is suspected to have changed. Sudden and significant changes in the dimensions of a group's bounding box might indicate that such an event as recently occurred. So too can persistent changes in the number of faces associated to the group on a frame by frame basis. Alternatively, some trackers may be able to detect merge and split events between moving objects, and these cues could be useful for detecting changes in group membership.

Additionally, the system is expected to maintain a face history for each person group observed by the face tracker. A face history is essentially a smaller face image log, containing all faces that were ever detected and associated to the group. As with the global face log, images in the face history should be labeled by the frame in which they originated. A face history is considered to be complete only after the person group has exited the scene.

Once the candidate face images has been acquired at step 712 based upon object tracking within the video sequence, the analysis of the candidate images is performed at step 714, as will be discussed in further detail in connection with FIG. 9. Based upon the criteria associated with the image a quality score is assigned to the image. The image is then stored to the face history log at step 716. If multiple face images generated by the group individual scores can be assigned to each image or may be an aggregate score of the images. The face images may be periodically purged based upon system constraints such as a number of images (dictated capacity or resource usage of the system or storage devices) or by defining a minimum quality threshold or a combination of factors to reduce the number of face images stored at step 718. At step 720 it is then determined if the group has exited the scene. If the group has not exited, NO at step 720, the method continues at step 712. If the group has excited, or potentially if the membership of the group has changed, YES at step 720, the face log is then purged to ensure that only face images of a minimum quality are stored in the face log as discussed in connection with FIG. 10 at step 722. The face log may then be stored at step 724 and have metadata with the quality score associated with the images or be indexed to the original video sequence for later reference.

Figure 8:
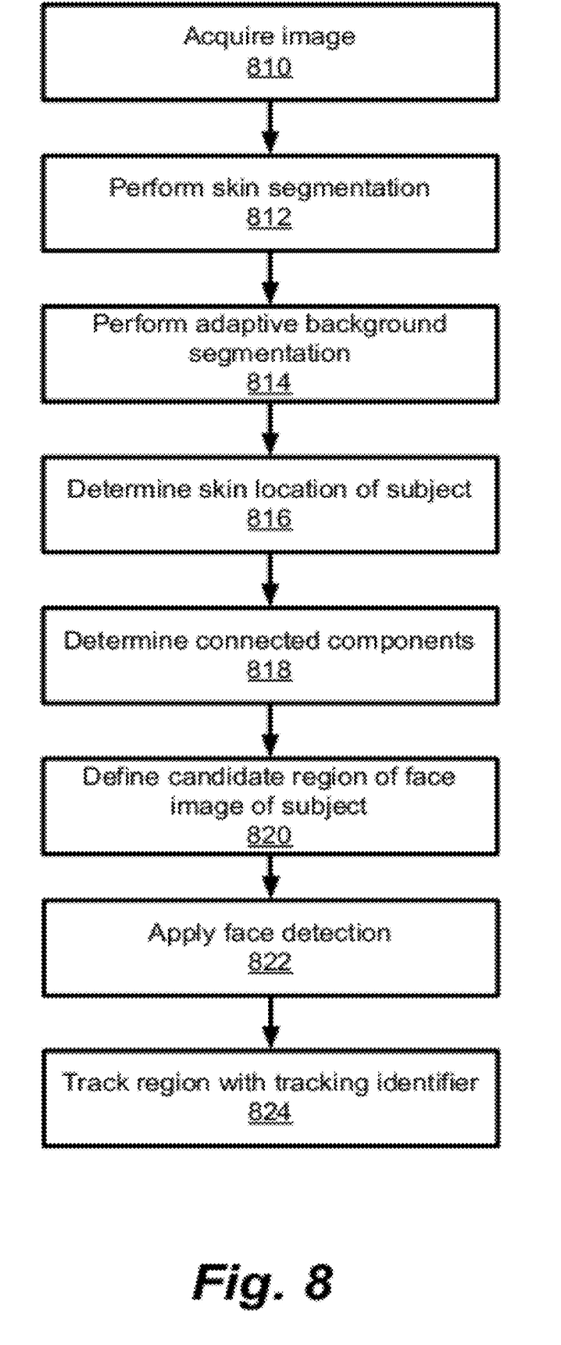
FIG. 8 is a method of face detection and tracking.

FIG. 8 describes a method of obtaining the face image from a video sequence. The image is acquired at step 810 from a video source or from a storage device. The image is analyzed to determine skin segmentation visible in the image at step 812. This can be performed by denoting the location of flesh colored pixels visible in the frame providing a binary image. At step 814 adaptive background segmentation can be performed. This provides a binary image representing the location of foreground objects. A binary AND function can be performed to provide a binary image denoting the location of pixels likely representing skin at step 816. At step 818 the connected components are determined defining a facial image. A rectangular region can then be defined providing a region of interest around the face image at step 820. Face detection is then applied to the region at step 822 to determine if the candidate region contains a face image. The rectangular region can then be tracked as movement occurs at step 824 within the video sequence and identifiers can be associated by metadata to the face image and the tracked region and the generated face images. It should be understood that alternating tracking and face detection methods may be utilized for generating face images.

Figure 9:
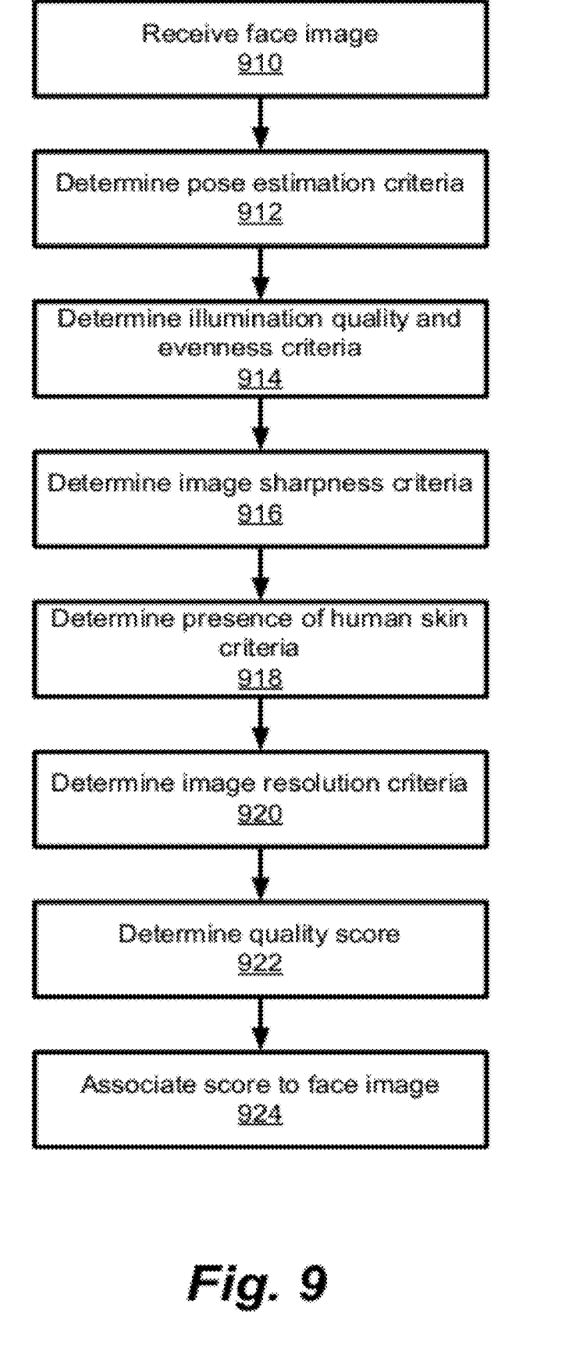
FIG. 9 is a method of face image quality analysis.

FIG. 9 illustrates a method for generating a quality score for the face image based upon image criteria assessment. At step 910 the face image is retrieved by the quality analysis module 140. A value is then determined for each of the defined criteria. At step 912 a pose estimation value is determined by pose estimation module 142, as discussed previously, by determining the position and orientation of the face within the frame and assigned a sharpness score. At step 914 the illumination quality of the image is determined by the illumination quality module 144. Illumination quality can be assessed by two criteria and therefore generates two scores, one for dynamic range and one for evenness within the image. The sharpness of the image is then determined at step 916 by module 146 producing a sharpness score. At step 918 the presence of human skin is determined by human skin module 148 with an associated score. Finally the image resolution is assigned a score at step 920 by module 150. The score assigned to each criteria is then combined with predefined weights and thresholds, if defined, to generate an overall score at step 922. The score is then associated with the face image at step 924. It should be understood that the scoring of each criteria may be performed in any order or scored simultaneously and no particular order is required. The images can then be discarded or stored based upon the generated score. The weights and thresholds utilized may be dependent on aspects of the video system by which the face logs are acquired, such color, resolution, motion content etc as well as other processing aspects related to the tracking and face recognition software.

Figure 10:
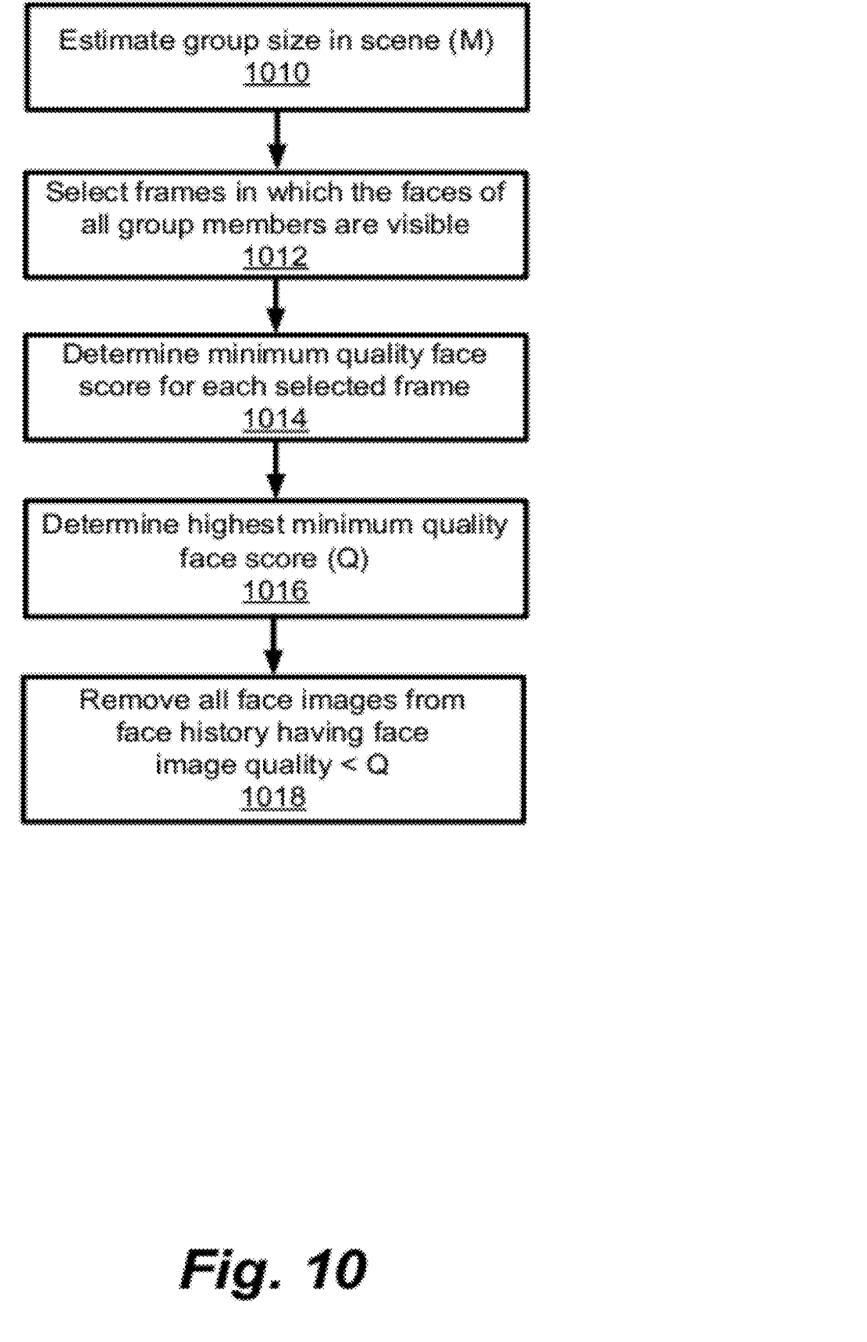
FIG. 10 is a method of face log purging.

FIG. 10 illustrates a method for purging a person group face history which may be called periodically when the group exits the scene. In any scene a sizeable number of face images may be generated and potentially stored. The purging of the face log may be performed by the quality analysis module 140 or by a dedicated process which determines when a group has excited the scene or membership has changed. In order to estimate a group's size at step 1010, it is assumed that some frames exists in which the faces of all group members are clearly visible. Consequently, the group size can be estimated as the maximum number of faces ever detected (M) and associated to the group in any single frame. This can be determined by searching a group's face history at the moment that the face history becomes complete.

Once a group's size can be estimated, it becomes possible to identify the historical frames in which all M group members were detected at step 1012. From this subset of frames, one frame will best represent the group. For each of the frames the minimum quality score for the associated face images is determined at step 1014. Of the minimum quality scores, the maximum of the determined scores is determined at step 1016. This will be the frame with the best minimum quality face (Q). All faces in the group's face history having a quality less than Q are then be discarded at step 1016, and any faces that remain are added to the global face log.

By using M, the percentage of frames in which the faces of all group members are visible can be determined. Unfortunately, falsely detected faces can artificially inflate the estimated group size M. Since false positives are likely to score quite poorly in quality, the situation could result in a low quality threshold Q. With a low Q, many faces will be considered of sufficient quality to be added to the global face log. One might suspect that the group size has been overestimated when fewer than a defined percentage value such as for example 10% of all frames in the group's face history contain M (or more) faces. In these situations the estimated group size can be reduced to a level that satisfies this condition. Extreme caution must be employed in order to avoid underestimating the group size.

Another main concern is that a group's face history continues to grow until the group leaves the scene. If the group remains onscreen for any extended period of time, storing the face history could become prohibitively expensive. Thus, low quality face images may be removed from the face history whenever its memory requirements or number of images approaches a predetermined limit. Alternatively, low quality images may be purged on regular periodic intervals. In either case, the purge operation proceeds by using the same method described above, exactly as if the group has recently exited the scene. Care must be taken to ensure that the faces which are purged are still represented in any statistics used to estimate of group size. Additionally, images from frames containing more than M faces are never discarded. This ensures that faces from these frames will be available in case the estimate of group size is increased in future invocations of the algorithm. By definition, fewer than 10% of all frames will contain faces that are kept for this precautionary measure.

It should be understood that although the group concept is discussed, the algorithm can easily be modified to discard face images when tracking a single individual (M=1) within the scene. Each visible face within a scene may be treated independently and not utilize the group concept.

Figure 11:
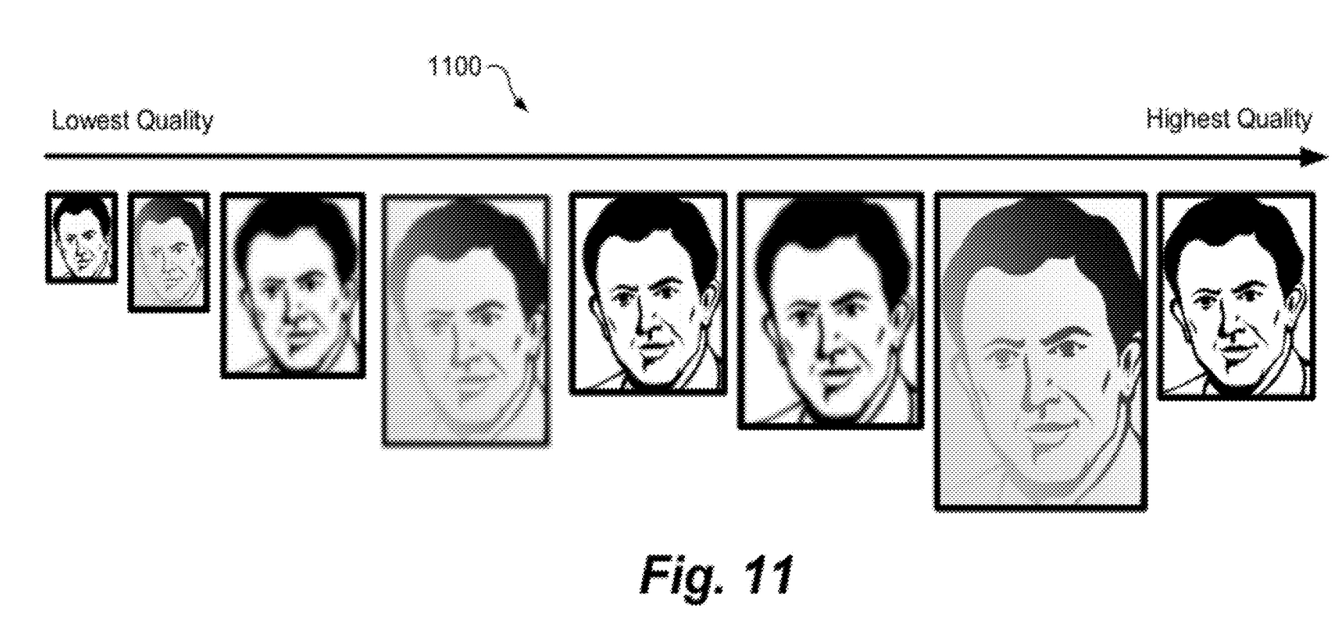
FIG. 11 is an illustration of a face log comprising multiple face images of a single subject.

FIG. 11 illustrates a face log for one member of the group with varying quality images. The face log 1100 can be ordered in sequence of the quality score or based upon time frame index for storage. Each member of the group may be stored in an individual face log or they may be stored as a group or global face log. In a scenario where one individual is tracked over time you will have a single face log with the individual. In group scenario where the tracker can not unambiguously track individual with confidence the purge algorithm will ensure that a group of faces is stored in which there is at least one face of each individual in the scene however there might be multiple occurrences of once face. The additional metadata associated with the images may be used for viewing or storage. Implementing the quality score assessment enables the overall size of the face log to be considerably reduced compared to the potential face images that could be contained in an unedited log. Once the face log is created and is associated with an individual further purging or reduction of the face log can be performed by removing lower quality images as required therefore only keeping the best quality images.

Examples of suitable computing system environments or configurations that may be suitable for implementing various embodiments include: a general purpose personal computer (PC); a hand-held or laptop computer; multi-processor based systems; microprocessor based systems; programmable consumer electronics; network computers, minicomputers, mainframe computers and distributed computing environments.

Components of a typical computing device include, but are not limited to, a processing unit, an input/output interface, a system memory, and a system bus. The system bus communicatively connects the aforementioned components and numerous other cooperatively interactive components. The input/output interface interacts with external components through an input/output unit (which can include keyboard, mouse-type controllers, monitors, media readers/writers and the like). The system memory instantiates various components and operations of the face log construction according to embodiments of the present invention.

The description does not limit the implementation of the embodiments of the present invention to any particular computer programming language. The computer program product may be implemented in many computer programming languages provided that the OS (Operating System) provides the facilities that may support the requirements of the computer program product. Any limitations presented would be a result of a particular type of operating system, computer programming language, or database management system and would not be a limitation of the embodiments of the present invention described herein.

The embodiments of the invention described above are intended to be illustrative only. The scope of the invention is therefore intended to be limited solely by the scope of the appended claims.

The invention claimed is:

1. A method of generating person oriented face logs from a video sequence, the method comprising the steps of:
   acquiring a plurality of frames from the video sequence;
   detecting a face of an individual within a first frame of the plurality of frames;
   performing continuous tracking of the face of the individual over the plurality of frames;
   extracting from the first frame a first face image of the face of the individual;
   storing the first face image in a face log, the face log for storing face images of the face of the individual;
   extracting from a second frame of the plurality of frames a second face image of the face of the individual with use of the continuous tracking of the face;
   determining a first quality score for the first face image, the first quality score based upon assessment of the first face image on the basis of a plurality of criteria;
   determining a second quality score for the second face image, the second quality score based upon assessment of the second face image on the basis of the plurality of criteria; and
   performing one of:
      purging the first face image from the face log and storing the second face image in the face log if the first quality score is below the second quality score and if the second face image is absent from the face log;
      purging the first face image from the face log if the first quality score is below the second quality score and if the second face image is already stored in the face log; and
      purging the first face image from the face log if the first quality score is below a minimum quality score.

2. The method of claim 1 wherein each of the first quality score and the second quality score is a respective weighted sum of scores determined in respect of respectively the first face image and the second face image on the basis of the plurality of criteria.

3. The method of claim 2 wherein the plurality of criteria is selected from a face image characteristic group consisting of: pose estimation; illumination quality criteria; image sharpness; skin content; and image resolution.

4. The method of claim 3 wherein illumination quality criteria for scoring any specific face image further comprises criteria for dynamic range of illumination and evenness of illumination of a face of the specific face image.

5. The method of claim 4 wherein a threshold is associated with each criterion of the plurality of criteria, the threshold used with a score determined in respect of the associated criterion to determine if the associated criterion is utilized in determining the quality score.

6. The method of claim 1 further comprising:
   estimating a group size of a group of individuals in the video sequence;
   selecting a second plurality of frames from the plurality of frames of the video sequence in which faces of all individuals of the group are visible;
   for each frame of the second plurality of frames:
      detecting a respective face of each individual of the group;
      extracting from the frame a respective face image of each respective face;
      storing each respective face image in a respective face log of an individual of the group whose face appears in the respective face image;
      determining a respective quality score for each respective face image, the respective quality score based upon assessment of the respective face image on the basis of the plurality of criteria; and
      determining from respective quality scores a minimum respective quality score for the respective face images within the frame;
   determining for all of the frames of the second plurality of frames a highest minimum respective quality score; and
   purging all respective face images from the respective face logs with respective quality scores below the highest minimum respective quality score and purging all respective face images from the respective face logs with respective quality scores below the minimum quality score.

7. The method of claim 1 wherein purging the face log occurs when according to the continuous tracking of the face of the individual, a video image of the individual exits the plurality of frames from the video sequence.

8. The method of claim 1 wherein purging the face log occurs based upon storage constraints.

9. The method of claim 1 wherein each quality score associated with each face image is stored in the face log in metadata associated with the face image.

10. The method of claim 1 further comprising the steps of:
    determining a candidate region in each frame of the plurality of frames;
    tracking the candidate region between frames; and
    performing face detection on the candidate region.

11. A system for generating person oriented face logs from a video sequence, the system comprising:
    a face detection module for, within each frame of the video sequence, detecting face of an individual and extracting a first face image of the face of the individual, and for extracting a second face image of the face of the individual;
    a tracking module for performing continuous tracking of the face of the individual within frames of the video sequence, the second face image of the face of the individual extracted by the face detection module with use of the continuous tracking of the face of the individual performed by the tracking module;
    a quality analysis module for receiving the first face image and the second face image from the face detection module and for determining a first quality score for the first face image, the first quality score based upon assessment of the first face image on the basis of a plurality of criteria, and for determining a second quality score for the second face image, the second quality score based upon assessment of the second face image on the basis of the plurality of criteria; and a storage device for storing the first face image with the first quality score and the second face image with the second quality score in a face log, the face log for storing face images and quality scores for the face images of the face of the individual, wherein the face log is periodically purged of received face images with performance of one of:

purging the first face image from the face log and storing the second face image in the face log if the first quality score is below the second quality score and if the second face image is absent from the face log;

purging the first face image from the face log if the first quality score is below the second quality score and if the second face image is already stored in the face log; and purging the first face image from the face log if the first quality score is below a minimum quality score.

12. The system of claim 11 wherein the tracking module further is for tracking a candidate region between frames of the video sequence and for providing the candidate region to the face detection module.

13. The system of claim 11 wherein the each of the first quality score and the second quality score is generated by a respective weighted sum of scores determined in respect of respectively the first face image and the second face image on the basis of the plurality of criteria.

14. The system of claim 13 wherein the plurality of criteria is selected from an image characteristic group consisting of: pose estimation; illumination quality criteria; image sharpness; skin content; and image resolution.

15. The system of claim 14 wherein illumination quality criteria for scoring any specific face image further comprises criteria for dynamic range of illumination and evenness of illumination of a face of the specific face image.

16. The system of claim 15 wherein a threshold is associated with each criterion of the plurality of criteria, the threshold associated with the criterion used with a score determined in respect of the criterion to determine if the criterion is utilized in determining the quality score.

17. The system of claim 11 wherein purging of the face images is further performed by:

estimating a group size of a group of individuals in the video sequence;

selecting a second plurality of frames from the plurality of frames of the video sequence in which faces of all individuals of the group are visible;

for each frame of the second plurality of frames:
detecting a respective face of each individual of the group;
extracting from the frame a respective face image of each respective face;
storing each respective face image in a respective face log of an individual of the group whose face appears in the respective face image;

determining a respective quality score for each respective face image, the respective quality score based upon assessment of the respective face image on the basis of the plurality of criteria; and determining from respective quality scores a minimum respective quality score for the respective face images within the frame;

determining for all of the frames of the second plurality of frames a highest minimum respective quality score; and purging from the respective face logs all respective face images with respective quality scores below the highest minimum respective quality score and all respective face images with respective quality scores below the minimum quality score.

18. The system of claim 16 wherein purging the face log occurs when according to the tracking of the face of the individual, a video image of the individual exits the plurality of frames from the video sequence.

19. The system of claim 11 wherein each quality score associated with each face image is stored in the face log in metadata associated with the face image.

20. A non-transitory computer readable medium containing instructions for generating person oriented face logs from a video sequence, the instructions which when executed by a processor perform the steps of:

acquiring a plurality of frames from the video sequence;

detecting a face of an individual within a first frame of the plurality of frames;

performing continuous tracking of the face of the individual over the plurality of frames;

extracting from the first frame a first face image of the face of the individual;

storing the first face image in a face log, the face log for storing face images of the face of the individual;

extracting from a second frame of the plurality of frames a second face image of the face of the individual with use of the continuous tracking of the face;

determining a first quality score for the first face image, the first quality score based upon assessment of the first face image on the basis of a plurality of criteria;

determining a second quality score for the second face image, the second quality score based upon assessment of the second face image on the basis of the plurality of criteria; and performing one of:
purging the first face image from the face log and storing the second face image in the face log if the first quality score is below the second quality score and if the second face image is absent from the face log;

purging the first face image from the face log if the first quality score is below the second quality score and if the second face image is already stored in the face log; and purging the first face image from the face log if the first quality score is below a minimum quality score.

* * * * *